United States Patent
Nategh et al.

(10) Patent No.: US 12,401,242 B2
(45) Date of Patent: Aug. 26, 2025

(54) ELECTRIC MOTOR COMPRISING A FLUX BARRIER

(71) Applicant: Volvo Car Corporation, Gothenburg (SE)

(72) Inventors: Shafigh Nategh, Mölnlycke (SE); Johan Cederlund, Torslanda (SE)

(73) Assignee: Volvo Car Corporation, Gothenburg (SE)

(*) Notice: Subject to any disclaimer, the term of this patent is extended or adjusted under 35 U.S.C. 154(b) by 205 days.

(21) Appl. No.: 18/092,462

(22) Filed: Jan. 3, 2023

(65) Prior Publication Data
US 2023/0231430 A1    Jul. 20, 2023

(30) Foreign Application Priority Data
Jan. 18, 2022 (EP) .................................... 22152086

(51) Int. Cl.
| | | |
|---|---|---|
| *H02K 1/276* | (2022.01) | |
| *B60K 1/00* | (2006.01) | |
| *H02K 21/14* | (2006.01) | |

(52) U.S. Cl.
CPC ........... *H02K 1/2766* (2013.01); *H02K 21/14* (2013.01); *B60K 1/00* (2013.01); *H02K 2213/03* (2013.01)

(58) Field of Classification Search
CPC ... H02K 21/14; H02K 2213/03; H02K 1/2766
See application file for complete search history.

(56) References Cited

U.S. PATENT DOCUMENTS

| | | | |
|---|---|---|---|
| 8,294,320 B2 | 10/2012 | Vyas | |
| 2019/0199150 A1* | 6/2019 | Cesa | H02K 21/14 |
| 2020/0212736 A1* | 7/2020 | Ohzu | H02K 1/276 |
| 2021/0211005 A1* | 7/2021 | Zhang | H02K 1/2766 |
| 2021/0296948 A1* | 9/2021 | Yen | H02K 21/46 |
| 2022/0014059 A1* | 1/2022 | Nakata | H02P 21/06 |

FOREIGN PATENT DOCUMENTS

| | | | |
|---|---|---|---|
| CN | 109412300 A | 3/2019 | |
| CN | 110838780 B | 5/2021 | |
| JP | 2015073397 A * | 4/2015 | |
| WO | WO-2018099811 A1 * | 6/2018 | H02K 1/274 |

OTHER PUBLICATIONS

Jul. 6, 2022 European Search Report issued in corresponding EP Application No. 22152086.

* cited by examiner

*Primary Examiner* — Forrest M Phillips
(74) *Attorney, Agent, or Firm* — Clements Bernard Walker; Christopher L. Bernard

(57) ABSTRACT

An electric motor is provided including a rotor and an outer member that is coaxially placed around the inner member and having radially oriented teeth. The teeth have end parts with a width Wt, adjacent teeth being separated by a slot of slot width Wg. A number of barrier members are provided in the inner member near the inner perimeter, each barrier member having a width Wb that generally corresponds to the width Wt and having curved side sections at each end of the central section having a width that generally corresponds with the slot width Wg. The barrier members reduce electromagnetic NVH by preventing magnetic flux from passing from the slots on each side of the teeth, into the inner member.

16 Claims, 3 Drawing Sheets

ELECTRIC MOTOR COMPRISING A FLUX BARRIER

CROSS-REFERENCE TO RELATED APPLICATION

The disclosure claims the benefit of priority of co-pending European Patent Application No. 22152086.9, filed on Jan. 18, 2022, and entitled "Electric Motor Comprising a Flux Barrier," the contents of which are incorporated in full by reference herein.

TECHNICAL FIELD

The disclosure relates to an electric motor including a rotor with a longitudinal axis having a generally circular inner perimeter in a transverse plane that is situated transversely to the longitudinal axis, and supporting magnetic elements that are mounted near the inner perimeter, and a stator that is coaxially placed around the inner member and having radially oriented teeth with end parts that are placed on an outer perimeter extending near the inner perimeter, the end parts having a width Wt, adjacent teeth being separated in the transverse plane by a slot with a circumferential slot width Wg. The disclosure furthermore relates to an electric vehicle including such a motor.

BACKGROUND

Electrical machines include a stator and a rotor. The stator represents the stationary part of the structure having stator teeth and windings around the teeth that are powered to generate a rotating magnetic field. The rotor is placed within the stator and carries permanent magnets. It is rotated by the interaction of the magnetic field of the permanent magnets with the magnetic field that is generated by the stator windings, to provide a driving force for an Electric Vehicle (EV).

The interaction between the rotor and the stator results in forces acting on the stator teeth. These forces are considered as the main sources of the electromagnetic noise in electrical machines and contribute to the total noise level that is emitted from the electrical propulsion system, in particular in low speed ranges.

By varying the magnetic permeability in the center of the pole, the flux density distribution in the rotor can be designed in a way that the effect of "slotting" (which occurs when the pole passes individual teeth, analogous to gear teeth meshing) is decreased without this effect resulting in a significant decrease of the torque that is produced or on the amplitudes of other frequency components in the force spectrum.

A design is known that reduces noise, vibration and harshness (VNH) in permanent magnet synchronous motors, based on simulation, in a powertrain of electric vehicles by providing magnetic barriers around the permanent magnets in the form of barrier holes in a double "herringbone" structure.

The present disclosure proposes a specific design of an electric motor by adding a flux barrier that reduces noises levels without reducing the torque output or reducing effective operation through its range of operational speeds.

SUMMARY

An electric motor according to the disclosure includes a number of barrier members being provided in the inner member near the inner perimeter, each barrier member having a width Wb in a width direction that is transverse to a radial center line extending between a midpoint of the barrier member and the longitudinal axis L, a central section of the barrier members having a width Wc in the width direction that corresponds to the width Wt and having curved side sections at each end of the central section, the side sections having a width Ws in the width direction, corresponding to the slot width Wg, the barrier members being adapted, when with their mid-point on a radial center line of a predetermined tooth, for blocking magnetic flux passing in the transverse plane from the slots on each side of the predetermined tooth, into the inner member.

By influencing the magnetic permeability in the center of the pole, the flux density distribution in the rotor is shaped in a way that the effect of slotting, when the pole passes individual teeth, analogous to gear teeth meshing, is reduced, without negatively affecting the torque or the amplitudes of other frequency components in the force spectrum. By introducing a barrier that is slightly wider than the width of one tooth of the outer member and having rounded end sections in the center of the pole, the permeance is decreased locally, thus minimizing the effect of slotting.

The shape and dimensions of the barrier according to the disclosure were found to reduce noise levels by between 1 dB and 5 dB over the range of speeds up to 10.000 rpm, with the highest effects on traction motor noise levels at low motor speed ranges below 6000 rpm where motor noise is dominating.

A cylindrical outer member may be configured to form the stator that is situated with the radially extending stator teeth around the rotor.

The magnetic elements may be placed on each side of the radial center line with parts of the magnetic elements positioned at a smaller radial distance from the longitudinal axis than the barrier member.

The magnetic elements may include permanent magnets that are placed closer to the center line of the inner cylindrical member than the barrier member, in an orientation transverse to the radial direction, at an angle to the radial direction or both. The barrier member of the disclosure is effective in orienting the flux lines for producing an improved reluctance torque.

For each magnetic barrier member, two magnetic elements may be placed at an angle Ø to the radial center line, first end parts of the magnetic elements being positioned near the radial center line at a smaller radial distance from the longitudinal axis L than the barrier member, second end parts of the magnetic elements being positioned near the inner perimeter to form a V-shape that is open near the inner perimeter.

The barrier member can be placed at the open side of the V-shaped magnet configuration near the perimeter of the inner cylindrical member, and effectively prevents magnetic flux originating from the slot areas adjacent to the teeth, from interacting with the magnets.

The central section of the barrier member may include a generally elliptical perimeter part, the side sections being of generally circular shape, defined by respective circles with a midpoint on or near an endpoint of a major axis of the central section.

This shape was found to be particularly effective in noise reduction without negatively impacting on the torque generated.

The central section may have a central section (41) having a width Wc for which 0.7 Wt<Wc<1.3 Wt, a transverse section having a length Lt for which 0.1 Wc<Lt<0.7 Wc, and the circular parts having a diameter Ws for which 0.9 Wg<Ws<1.4 Wg.

The perimeter of the central part may be touching an end section at least in one point along a rounded area.

The rounded transition between the central section and the circular side sections allows forming of the barrier by machining the barrier space from the body of the central cylindrical member. As the curved side sections of the barrier member for the larger part determine the path of the flux lines passing from the rotor to the stator, the shape of the central section may be varied more freely in accordance with manufacturing demands.

At least one of the sides of the central section may be outwardly curved away from the major axis, relative to an elliptical line.

By extending one side of the perimeter of the central part towards the longitudinal axis of the inner cylindrical member, the motor performance, for instance torque, may be increased while at the same time achieving a reduction of NVH.

At least one of the perimeter sides of the central section may partly extend parallel to the major axis of the flux barrier.

The straight perimeter part of the barrier provides easier manufacturing and improved mechanical properties while achieving a reduction of NVH.

BRIEF DESCRIPTION OF THE DRAWINGS

An electric motor according to the disclosure will, by way of non-limiting example be described in detail with reference to the accompanying drawings. In the drawings.

DETAILED DESCRIPTION

Figure 1:
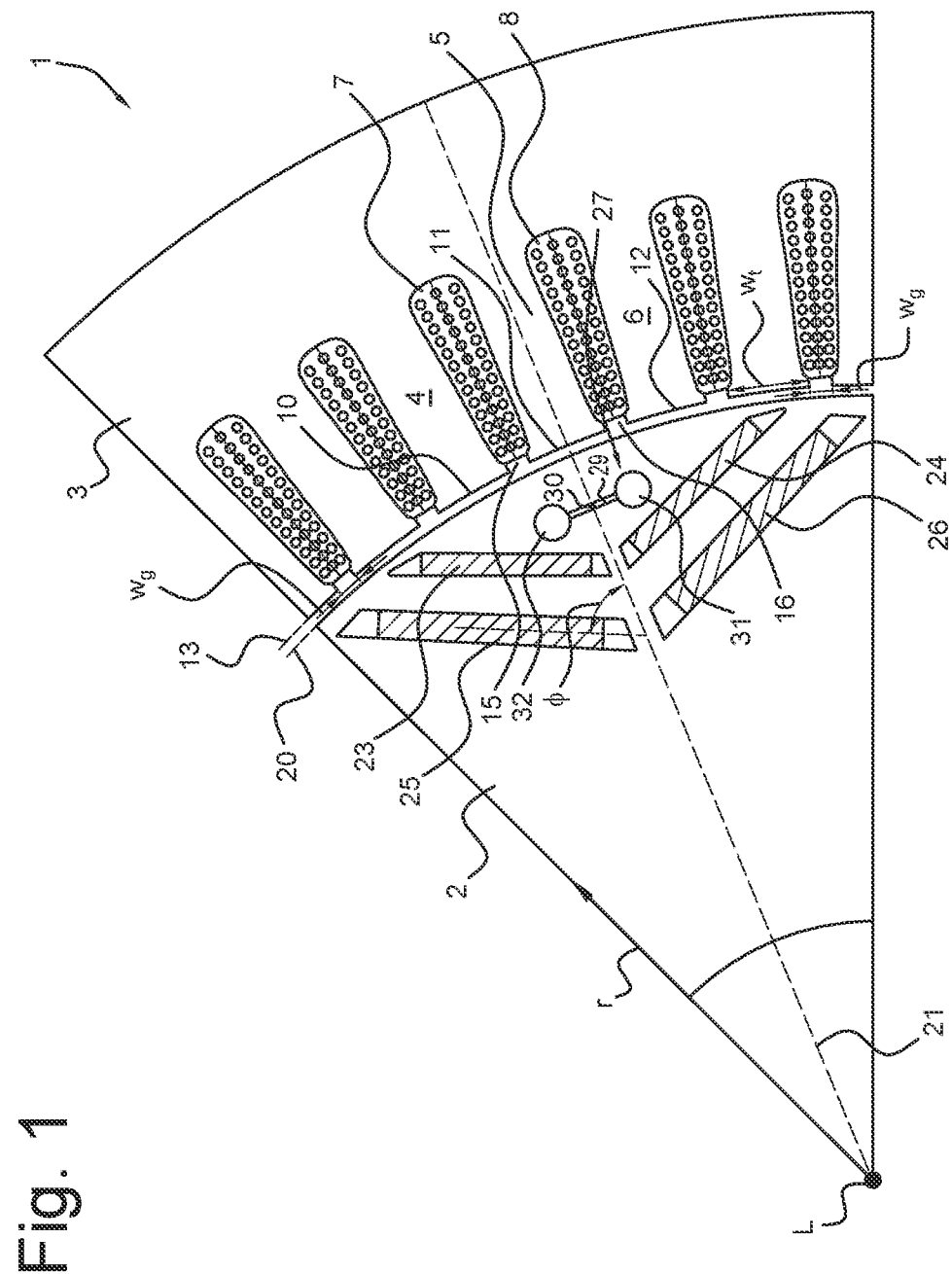
FIG. 1 shows a schematic cross-section of an electric motor including a flux barrier according to the disclosure.
Figure 2:
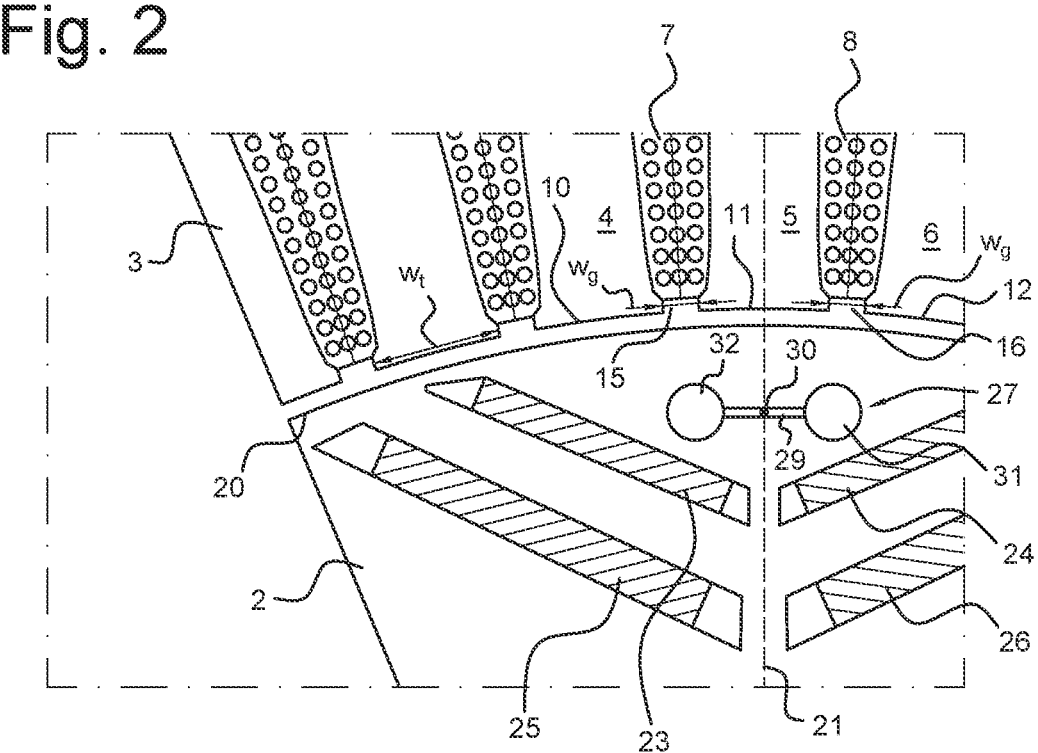
FIG. 2 shows an enlarged detail of the flux barrier of FIG. 1.

FIG. 1 shows an electric motor 1 with an inner rotor 2 and outer stator 3. The rotor 2 is rotatable around a longitudinal axis L that extends out of the plane of the drawing. The stator 3 includes radial teeth 4, 5, 6 with windings 7, 8 placed around each tooth. The end parts 10, 11, 12 or the teeth 4, 5, 6 are placed on an outer cylindrical perimeter 13 and have a circumferential width Wt of about 3 mm-20 mm, depending on the size of the motor. At the outer perimeter 13, the end parts 10, 11, 12 of adjacent teeth 4, 5 and 5, 6 are separated in a circumferential direction, along the perimeter 13, by a slot 15, 16 of a width Wg of about 0.7 mm-3 mm.

The rotor 2 is provided with an inner perimeter 20, situated at an air gap distance of about 0.7 mm-3 mm from the outer perimeter 13, in the radial direction r. The rotor 2 includes, on each side of radial center line 21, permanent magnets 23, 24, 25, 26 that interact with the magnetic field that is generated by the teeth 4, 5, 6 and the windings 7,8 of the stator. The magnets have a V-shaped orientation and are at a sharp angle Ø to the center line 21, so that pairs of magnets 25, 26 and 23, 24 define V-shapes with an open base near the perimeter 20.

A flux barrier 27 is provided in the rotor 2 between the magnets 23,24 and the inner perimeter 20, having a central section 29 and two rounded side sections 31, 32. When a midpoint 30 of the central section 29 of the flux barrier 27 is situated on the center line 21 of a tooth 5, the rounded side sections 30, 31 are positioned opposite slots 15 and 16 on each side of the tooth 5 and prevent magnetic flux from the slots 15, 16 from interacting with the magnets 23, 24, 25, 26, whereby noise and undesired vibrations are reduced. The flux barrier 27 includes a material of low permeability, such as air.

Figure 3:
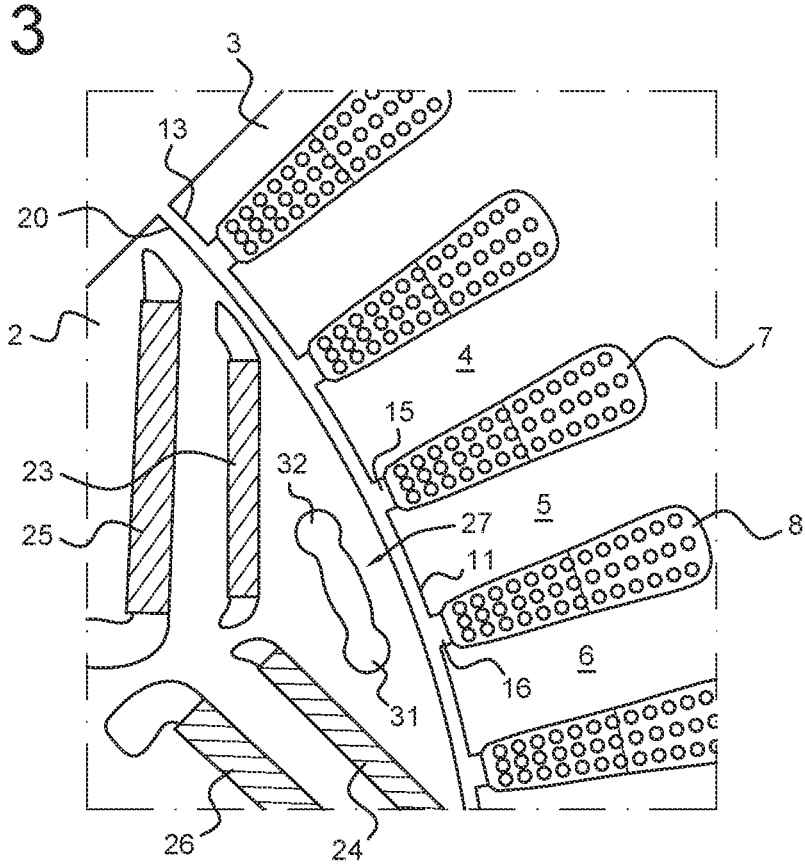
FIG. 3 shows a flux barrier with an elliptical central section and circular side sections.

FIG. 3 shows a flux barrier 27 having a perimeter that includes elliptical and circular sections, situated opposite the tooth 5 and blocking with its rounded sections 31, 32 flux from the slots 15 and 16. The rounded sections of the barrier member block the area with the highest flux density so that it does not coincide with the field that is imposed by the local permeance of the stator and the windings. The flux is "smeared out" to reduce the specific harmonic that arises from the interaction with the slots.

Figure 4A:
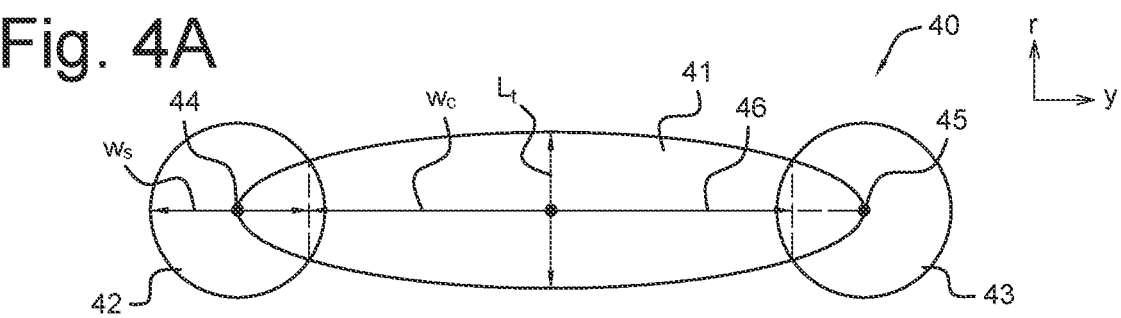
FIGS. 4a and 4b show the flux barrier of FIG. 3 on an enlarged scale.

FIG. 4a shows the construction of a flux barrier 40 from an elliptical central section 41 and two circular side sections 42, 43. The side sections 42, 43 are based on circles with their centers 44, 45 at the end points of the major axis 46 of central section 41. The total width of the flux barrier 40 in the transverse direction y is Wc+2*Ws and amounts to for instance 7 mm-25 mm. The dimension of the elliptical shape in the radial direction r, along the minor axis of the ellipse, may be 0.25 times the length of the major axis. The rounded side sections 42, 43 were found to result in effective blocking of the magnetic flux.

Figure 4B:
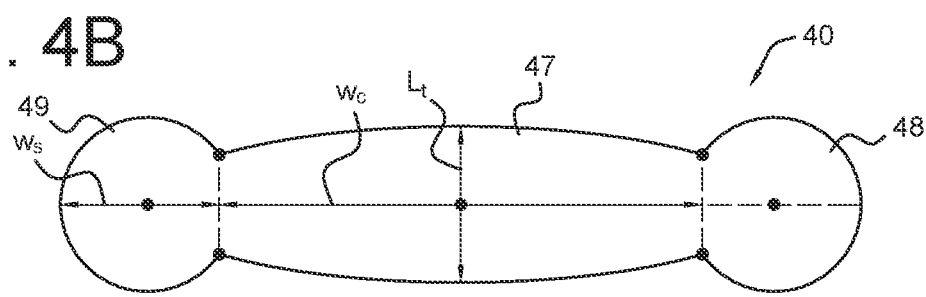

FIG. 4b shows the flux barrier 47 based on the construction of FIG. 4a with a central elliptical part 47 and two circular end parts 48, 49. The flux barrier 47 can be produced in the material of the rotor 2 by a material of low magnetic permeability, such as air, a resin or composite material, and the barriers can be formed by a hole that is punched in the steel laminate of the rotor 2.

Figure 5:
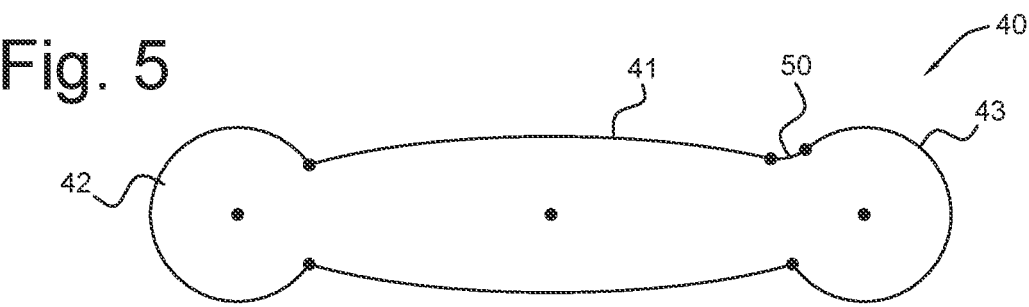
FIG. 5 shows a flux barrier with a curved transition of the central section to a side section.

FIG. 5 shows an embodiment of a flux barrier 40 with a curved transition of the circular side section 43 to the elliptical central part 41. The central part 41 interconnects the two curved side sections 43, and could be formed of an elliptical part or could alternatively be shaped as a slit.

Figure 6:
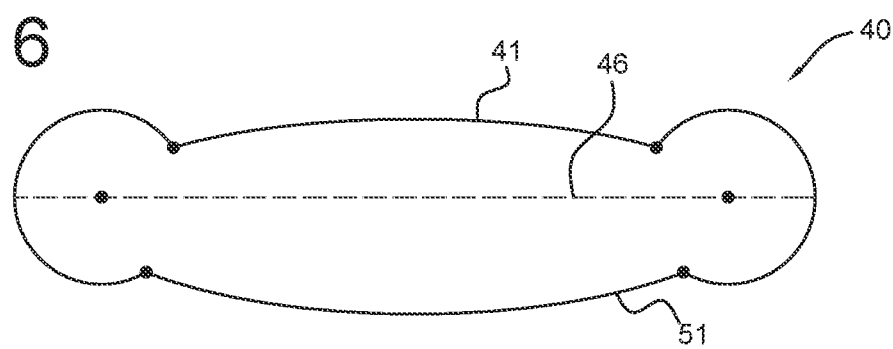
FIG. 6 shows a flux barrier with an elliptical central section having a larger curvature on one side.

FIG. 6 shows a lower side 51 of the flux barrier 40 being curved in the radial direction towards the inner perimeter.

Figure 7:
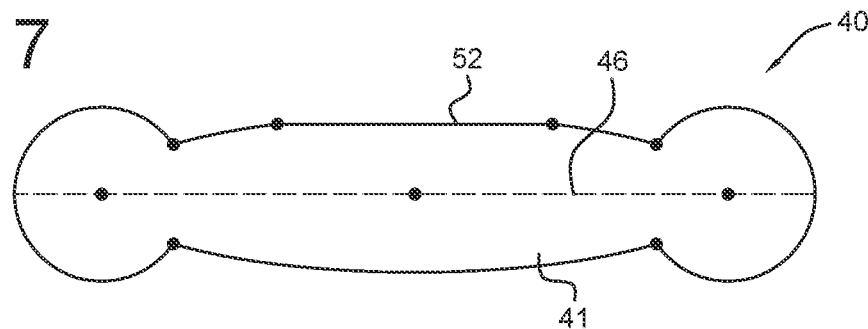
FIG. 7 shows a flux barrier with an elliptical central section having a straight side part.

FIG. 7 shows an upper side 52, of the flux barrier 40, closer to the longitudinal axis L, being formed by a straight side.

The designs according to FIGS. 6 and 7 will have a positive influence on the noise level. However, they have different influences on the level of the torque and performance of the designed electrical machine. Consequently, the specific design will be based on optimizing the emitted noise and produced motor performance.

The invention claimed is:
1. An electric motor, comprising:
   a rotor with a longitudinal axis L, having a generally circular inner perimeter in a transverse plane that is situated transversely to the longitudinal axis L, and supporting magnetic elements that are mounted near the inner perimeter;
   a stator coaxially arranged around rotor and having radially oriented teeth with end parts that are placed on an outer perimeter extending near the inner perimeter, the end parts having a width Wt, adjacent teeth being separated by a slot with a slot width Wg; and a number of barrier members being provided in the rotor near the inner perimeter, each barrier member having a width Wb in a width direction that is transverse to a radial center line extending between a midpoint of the barrier member and the longitudinal axis L, a central section of the barrier members having a width Wc in the width direction that generally corresponds to the width Wt and having curved side sections at each end of the central section, the side sections having a width Ws in the width direction, corresponding to the slot width Wg, the barrier members being adapted for blocking magnetic flux flowing along in the transverse plane from the slots into the rotor when the mid-point of the barrier members coincides with a radial center line of a predetermined tooth, wherein the central section comprises a generally elliptical perimeter part.

2. The electric motor according to claim 1, wherein magnetic elements are placed on each side of the radial center line with parts of the magnetic elements positioned at a smaller radial distance from the longitudinal axis than the barrier member.

3. The electric motor according to claim 1, for each barrier member two magnetic elements being placed at an angle Ø to the radial center line, first end parts of the magnetic elements being positioned near the radial center line at a smaller radial distance from the longitudinal axis L than the barrier member, second end parts of the magnetic elements being positioned near the inner perimeter to form a V-shape that is open near the inner perimeter.

4. The electric motor according to claim 1, the side sections being of generally circular shape, defined by respective circles with a midpoint on or near an endpoint of a major axis of the central section.

5. The electric motor according to claim 4, the central section having a width Wc for which 0.7Wt<Wc<1.3 Wt, a transverse section having a length Lt for which 0.1Wc<Lt<0.7Wc, and the circular parts having a diameter Ws for which 0.9Wg<Ws<1.4 Wg.

6. The electric motor according to claim 4, the perimeter of the central part touching an end section at least in one point along a rounded area.

7. The electric motor according to claim 4, wherein at least one of the sides of the central section is outwardly curved away from the major axis, relative to an elliptical line.

8. The electric motor according to claim 1, wherein at least one of the perimeter sides of the central section partly extends parallel to the major axis of the flux barrier.

9. An electric vehicle, comprising:
an electric motor, comprising:
a rotor with a longitudinal axis L, having a generally circular inner perimeter in a transverse plane that is situated transversely to the longitudinal axis L, and supporting magnetic elements that are mounted near the inner perimeter;

a stator coaxially arranged around rotor and having radially oriented teeth with end parts that are placed on an outer perimeter extending near the inner perimeter, the end parts having a width Wt, adjacent teeth being separated by a slot with a slot width Wg; and a number of barrier members being provided in the inner member near the inner perimeter, each barrier member having a width Wb in a width direction that is transverse to a radial center line extending between a midpoint of the barrier member and the longitudinal axis L, a central section of the barrier members having a width Wc in the width direction that generally corresponds to the width Wt and having curved side sections at each end of the central section, the side sections having a width Ws in the width direction, corresponding to the slot width Wg, the barrier members being adapted for blocking magnetic flux flowing along in the transverse plane from the slots into the rotor when the mid-point of the barrier members coincides with a radial center line of a predetermined tooth, wherein the central section comprises a generally elliptical perimeter part.

10. The electric vehicle according to claim 9, wherein magnetic elements are placed on each side of the radial center line with parts of the magnetic elements positioned at a smaller radial distance from the longitudinal axis than the barrier member.

11. The electric vehicle according to claim 9, for each barrier member two magnetic elements being placed at an angle Ø to the radial center line, first end parts of the magnetic elements being positioned near the radial center line at a smaller radial distance from the longitudinal axis L than the barrier member, second end parts of the magnetic elements being positioned near the inner perimeter to form a V-shape that is open near the inner perimeter.

12. The electric vehicle according to claim 9, the side sections being of generally circular shape, defined by respective circles with a midpoint on or near an endpoint of a major axis of the central section.

13. The electric vehicle according to claim 12, the central section having a width Wc for which 0.7Wt<Wc<1.3 Wt, a transverse section having a length Lt for which 0.1Wc<Lt<0.7Wc, and the circular parts having a diameter Ws for which 0.9Wg<Ws<1.4 Wg.

14. The electric vehicle according to claim 12, the perimeter of the central part touching an end section at least in one point along a rounded area.

15. The electric vehicle according to claim 12, wherein at least one of the sides of the central section is outwardly curved away from the major axis, relative to an elliptical line.

16. The electric vehicle according to claim 9, wherein at least one of the perimeter sides of the central section partly extends parallel to the major axis of the flux barrier.

* * * * *